United States Patent [19]
Hwang

[11] Patent Number: 5,690,016
[45] Date of Patent: Nov. 25, 1997

[54] TIRE PUMP AND TOOL BOX COMBINATION

[76] Inventor: George Hwang, No. 65, Lane 45, Kwang Fu E. Rd., Pei Tou Hsiang, Changhwa Hsien, Taiwan

[21] Appl. No.: 656,836
[22] Filed: Jun. 3, 1996
[51] Int. Cl.[6] .................................................. F01B 31/00
[52] U.S. Cl. .......................... 92/58.1; 92/145; 417/234
[58] Field of Search .................... 92/145, 58.1, 128; 417/234

[56] References Cited

U.S. PATENT DOCUMENTS

| | | | |
|---|---|---|---|
| 785,154 | 3/1905 | Cordeau | 92/58.1 |
| 3,003,429 | 10/1961 | Petrusewicz et al. | 92/58.1 |
| 3,583,837 | 6/1971 | Rolsten | 417/554 |
| 4,569,275 | 2/1986 | Brunet | 417/572 |
| 5,433,136 | 7/1995 | Lung-Po | 92/58.1 |
| 5,551,848 | 9/1996 | Chuang et al. | 417/437 |

*Primary Examiner*—Thomas E. Denion
*Attorney, Agent, or Firm*—Varndell Legal Group

[57] ABSTRACT

A tire pump and tool box combination including a tire pump, and a tool box having a cylindrical connector at one end coupled to the piston rod of the tire pump and a corrugated surface portion adapted for holding by hand to reciprocate the piston rod of the tire pump.

3 Claims, 5 Drawing Sheets

TIRE PUMP AND TOOL BOX COMBINATION

BACKGROUND AND SUMMARY OF THE INVENTION

The present invention relates to a tire pump and tool box combination which combines a tool box and a tire pump together, permitting the tool box to be used as a handle for moving the piston rod of the tire pump by hand.

Riding a bicycle has nowadays become one of the most popularly accepted recreational activities. However, when riding a bicycle, the tire pressure must be maintained within a proper level. Therefore, a tire pump is necessary for inflating the tires. Furthermore, for maintaining or repairing a bicycle, a variety of bicycle tools may be used. When to carry bicycle tools on a bicycle, a tool box is needed.

The present invention combines a bicycle tool box and a tire pump into a unit so that the combination can be conveniently carried on a bicycle. The tool box has a cylindrical connector perpendicularly disposed at one end and coupled to the piston rod of the tire pump. Furthermore, the tool box has a corrugated surface portion for the holding of the hand positively. Therefore, the tool box can be used as a handle for the holding of the hand to reciprocate the piston rod of the tire pump.

DETAILED DESCRIPTION OF THE PREFERRED EMBODIMENT

Figure 1:
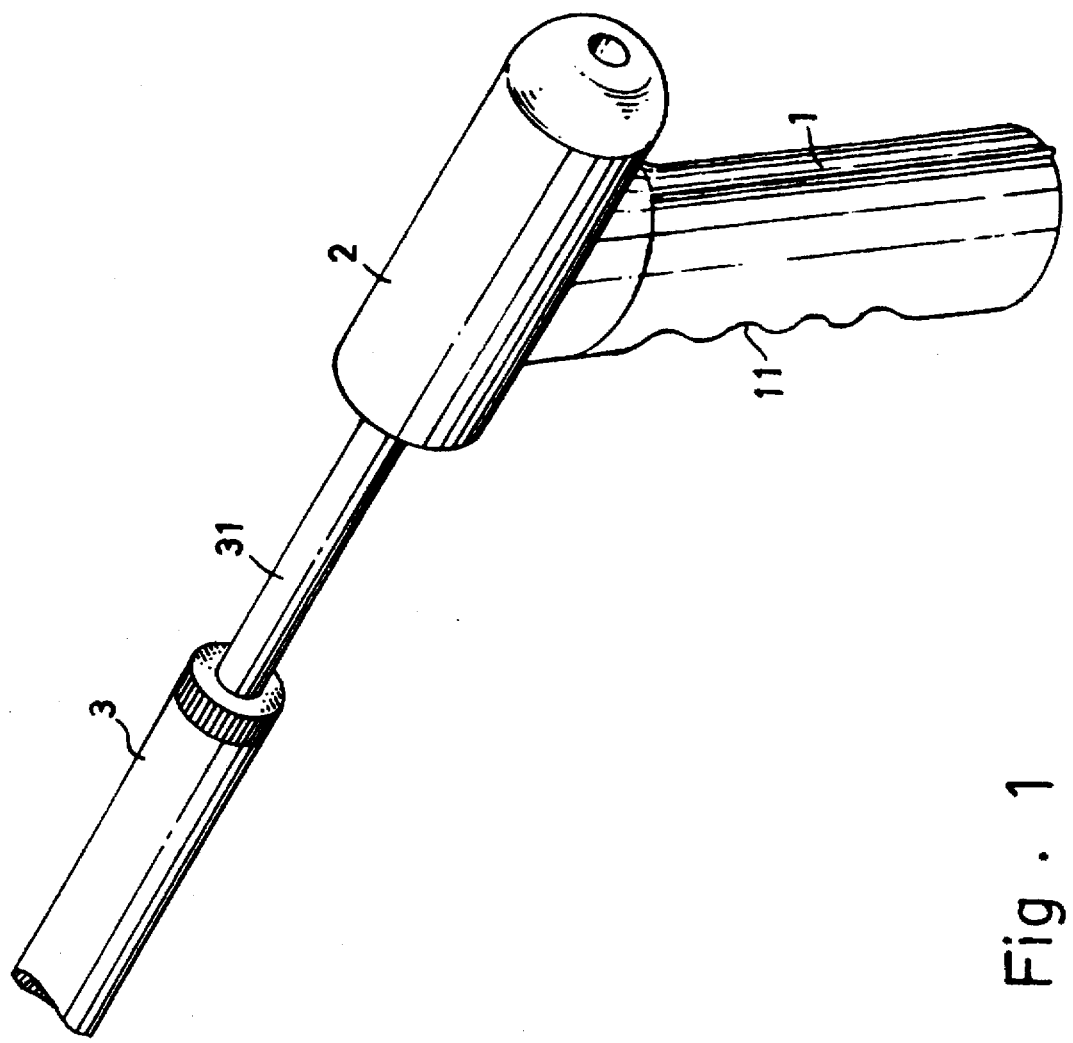
FIG. 1 is an elevational view of a tire pump and tool box combination according to the present invention.
Figure 2:
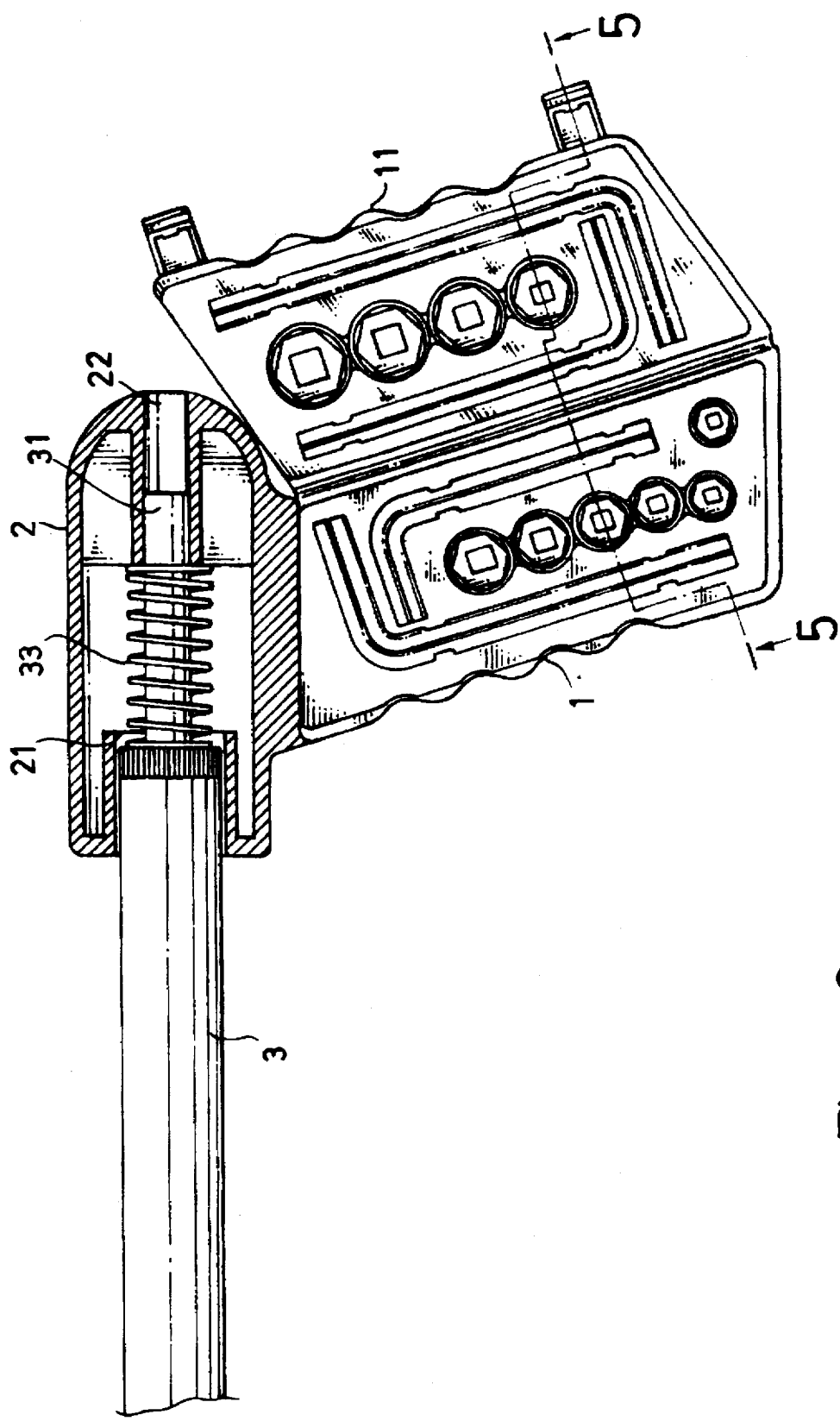
FIG. 2 is a sectional view of the tool box and the cylindrical connector of the tire pump and tool box combination shown in FIG. 1, showing the tool box opened.
Figure 3:
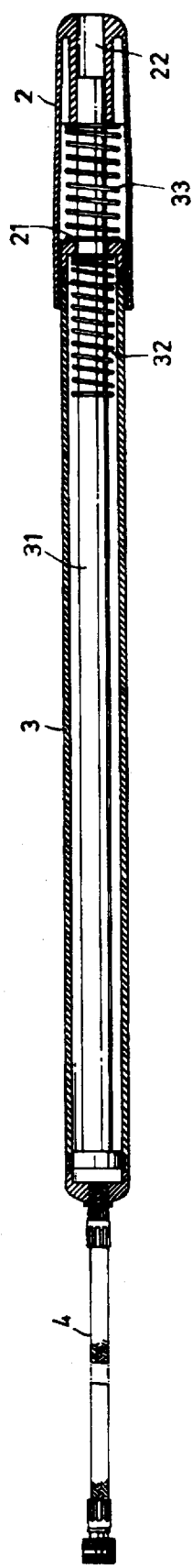
FIG. 3 is a longitudinal view in section of the tire pump and tool box combination shown in FIG. 1.
Figure 5:
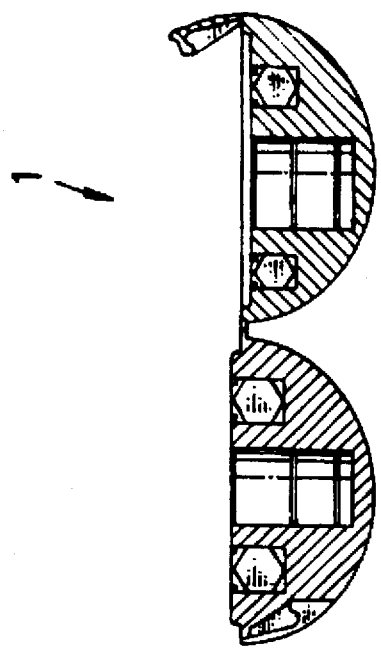
FIG. 5 is a sectional view taken along line 5—5 of FIG. 2, showing the tool box opened.
Figure 6:
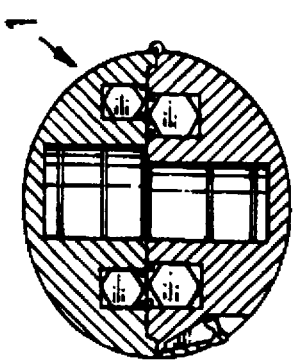
FIG. 6 is a cross sectional view showing the tool box closed according to the present invention.

Referring to FIGS. from 1, 2, 3, 5, and 6, a tire pump and tool combination in accordance with the present invention is generally comprised of a tire pump 3, and a tool box 1. The tool box 1 has a tool holding portion with a corrugated surface portion 11 convenient for the holding of the hand, and a cylindrical connector 2 at one end adapted for coupling to the piston rod 31 of the tire pump 3. The tool box 1 including the tool holding portion and the cylindrical connector 2 may be made in integrally by blow casting. The cylindrical connector 2 is perpendicularly connected to one end of the tool box 1, comprising a first hole 21 and a second hole 22 longitudinally connected. The diameter of the first hole 21 is slightly bigger than that of the tire pump 3. The diameter of the second hole 22 is approximately equal to that of the piston rod 31 of the tire pump 3. The piston rod 31 of the tire pump 3 is inserted through the first hole 21 and then plugged into the second hole 22. Two compression springs 32, 33 are respectively mounted around the piston rod 31 of the tire pump 3 to buffer its movement. One compression spring 32 is disposed outside the tire pump 3 and stopped between the casing of the tire pump 3 and the inside wall of the cylindrical connector 2; and the other compression spring 33 is disposed on the inside of the tire pump 3. When the combination is assembled, the tool box 1 is used as a handle for the holding of the hand to reciprocate the piston rod 31 of the tire pump 3, causing compressed air to be forced through a nozzle tube 4 into the inner tube of a bicycle tire. The tool box 1 defines a plurality of compartments adapted for holding a variety of bicycle tools (see FIGS. 2, 5, and 6).

Figure 4:
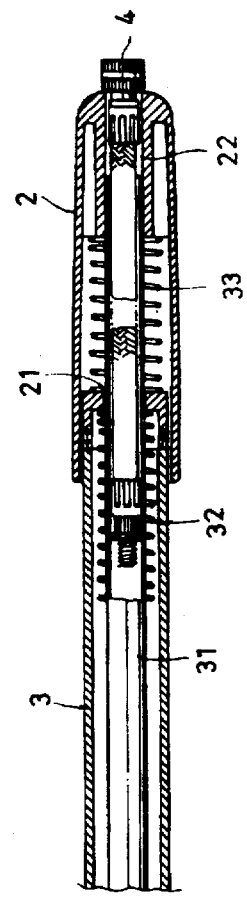
FIG. 4 is another sectional view of the tire pump of the tire pump and tool box combination shown in FIG. 1, showing the nozzle tube received in the piston rod.
Figure 7:
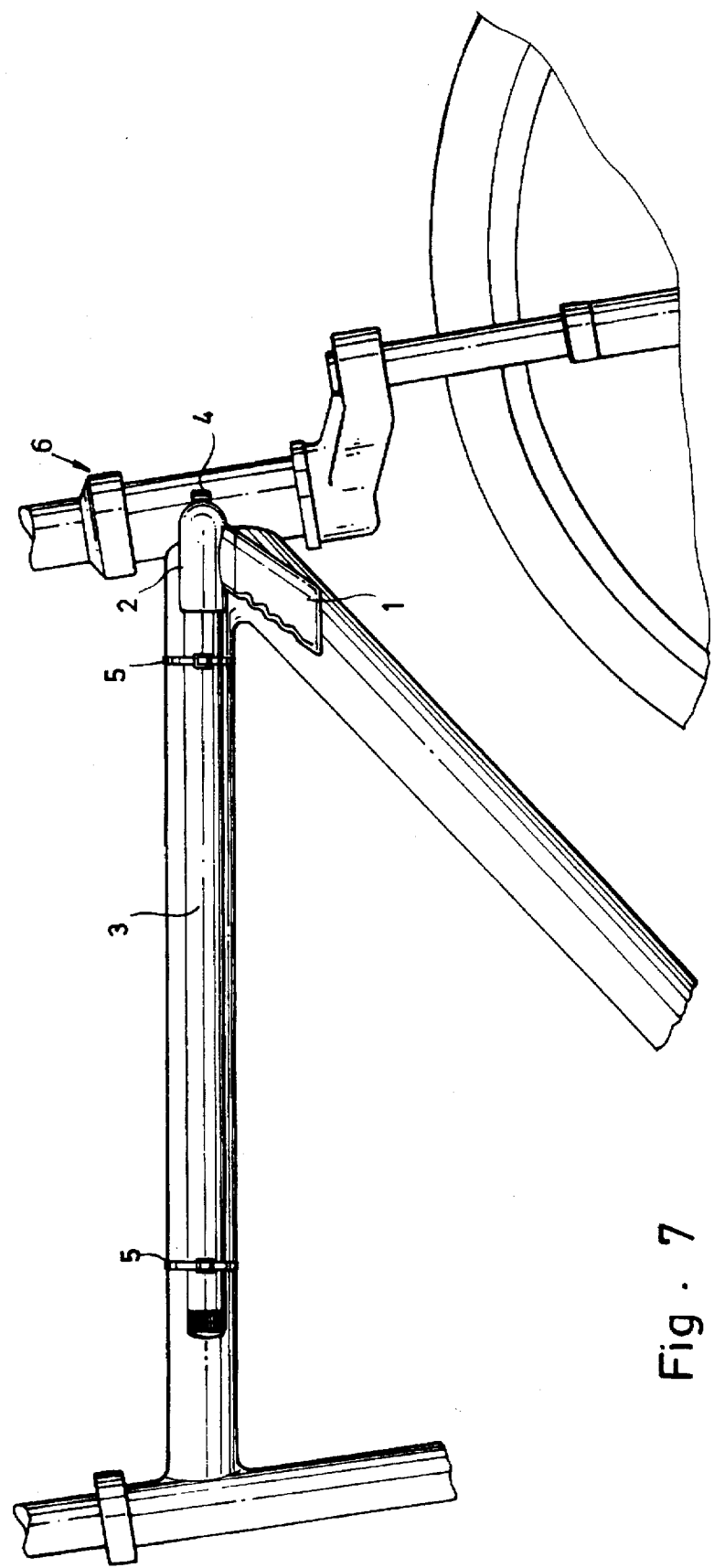
FIG. 7 shows the tire pump and tool box combination fastened to the top tube of a bicycle according to the present invention.

Referring to FIGS. 4 and 7, when not in use, the nozzle tube 4 can be inserted through the second hole 22 of the cylindrical connector 2 and received in the hollow rear end of the piston rod 31 (see FIG. 4), and the tire pump and tool box combination can be secured to the top tube of a bicycle 6 by clamp rings 5 (see FIG. 7).

I claim:

1. A tire pump and tool box combination comprising a tire pump having a piston rod reciprocated to pump air, and a tool box coupled to one end of said piston rod outside said tire pump, said tool box including a tool holding portion and a cylindrical connector, said tool holding portion having one end connected to said cylindrical connector, said one end of said tool holding portion extending from said cylindrical connector a length sufficient for grasping by hand, said tool holding portion having a corrugated outer surface portion for facilitating the grasping by hand and for reciprocating said piston rod, said cylindrical connector sharing a common axis with said piston rod and coupled to said piston rod, said cylindrical connector having a first hole at one end adapted for receiving one end of said tire pump and through which said piston rod passes, and a second hole at an opposite end longitudinally connected to said first hole and to which said piston rod is fixedly connected by plugging, and said tool holding portion having first and second halves opening along a longitudinal axis thereof for inserting and removing tools therefrom.

2. The tire pump and tool box combination of claim 1, wherein said tool holding portion includes plurality of compartments adapted for holding a variety of bicycle tools.

3. The tire pump and tool box combination of claim 1, wherein said tire pump includes a nozzle tube; and when said tire pump is not in use, said nozzle tube received in said second hole of said cylindrical connector.

* * * * *